Figure 1:
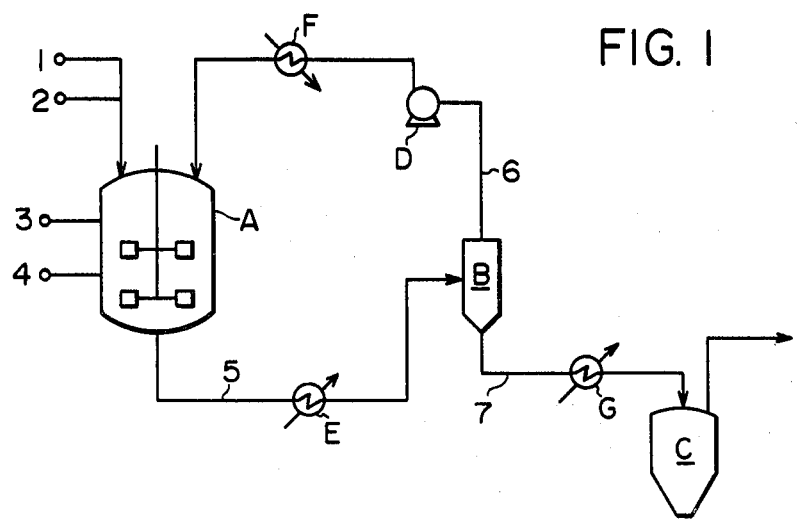

United States Patent [19]

Kabu et al.

[11] 4,433,121

[45] Feb. 21, 1984

[54] POLYMERIZATION PROCESS

[75] Inventors: Yasunori Kabu, Ichihara; Masayoshi Yasunaka; Yoshinori Morita, both of Iwakuni; Masanori Motowoka, Ohtake, all of Japan

[73] Assignee: Mitsui Petrochemical Industries, Ltd., Tokyo, Japan

[21] Appl. No.: 395,472

[22] Filed: Jul. 6, 1982

[30] Foreign Application Priority Data

Jul. 7, 1981 [JP] Japan .................................. 56-105137

[51] Int. Cl.$^3$ .............................................. C08F 2/04
[52] U.S. Cl. ........................................ 526/68; 526/88; 526/125; 526/348.6; 528/502
[58] Field of Search ..................................... 526/68, 88

[56] References Cited

U.S. PATENT DOCUMENTS

| | | | |
|---|---|---|---|
| 2,945,016 | 7/1960 | Benedict | 528/497 |
| 3,362,940 | 1/1968 | Edwards et al. | 526/68 |
| 3,362,943 | 1/1968 | Edwards et al. | 526/348.6 |
| 4,330,651 | 5/1982 | Sakurai et al. | 526/125 |

FOREIGN PATENT DOCUMENTS 1039911  8/1966  United Kingdom ................. 526/68

*Primary Examiner*—Edward J. Smith

*Attorney, Agent, or Firm*—Sherman & Shalloway

[57] ABSTRACT

In a process for polymerizing a monomer capable of being formed, upon polymerization, into a solution having an upper cloud point of the corresponding polymer in a reaction medium being liquid under the reaction conditions, the polymerization being carried out under such conditions that the resulting polymer dissolves in the reaction medium; the improvement wherein (i) the polymerization is carried out in a polymerization zone at a temperature above the upper cloud point of said polymer solution and under conditions which enable the polymer solution to be separated into two phases, (ii) the polymerization is carried out under stirring conditions which maintain the two phases under said phase-separating conditions in a dispersed and mixed state, and (iii) the resulting polymer solution is sent to a separating zone located independently of said polymerization zone, thereby separating it into two phases in the separating zone at a temperature above the upper cloud point, and thereafter, the polymer-rich liquid phase as a lower layer is recovered while the polymer-lean liquid phase as an upper layer is recycled to the polymerization zone.

7 Claims, 6 Drawing Figures

POLYMERIZATION PROCESS

This invention relates to an improvement in a solution-type process for polyermizing a monomer, such as an olefin, capable of being formed, upon polymerization, into a solution having an upper cloud point of the corresponding polymer in a reaction medium being liquid under the reaction conditions, the polymerization being carried out under such conditions that the resulting polymer dissolves in the reaction medium (i.e., solution polymerization conditions).

More specifically, this invention pertains to an improvement, in the aforesaid polymerization process, wherein (i) the polymerization is carried out in a polymerization zone at a temperature above the upper cloud point of said polymer solution and under conditions which enable the polymer solution to be separated into two phases, (ii) the polymerization is carried out under stirring conditions which maintain the two phases under said phase-separating conditions in a dispersed and mixed state, and (iii) the resulting polymer solution is set to a separating zone located independently of said polymerization zone, thereby separating it into two phases in the separating zone at a temperature above the upper cloud point, and thereafter, the polymer-rich liquid phase as a lower layer is recovered while the polymer-lean liquid phase as an upper layer is recycled to the polymerization zone.

The term "polymerization", as used herein, is sometimes used to denote copolymerization as well.

The above solution-type polymerization process is known as one type of process for producing polymers by polymerizing various polymerizable monomers. For example, in the polymerization of an olefin, a method is known to polymerize an olefin under conditions such that the resulting polymer dissolves in a reaction medium which is an inert hydrocarbon and/or the olefin itself being liquid under the reaction conditions. This method is particularly suitable for the production of ethylene copolymers having a medium to low density which are difficult to form by slurry polymerization.

The polymer solution in the reaction medium formed in such solution polymerization of olefins exhibits two cloud points. As the solution is cooled, a temperature will be reached at which the polymer precipitates from the solution to form cloudiness (the lower cloud point). On the other hand, as the solution is heated, a temperature will be reached at which the solution is separated into a polymer-rich liquid phase and a polymer-lean liquid phase to form cloudiness (the upper cloud point). Between the two cloud points, a homogeneous solution of the polymer in the reaction medium is formed. This phenomenon is known (see, for example, U.S. Pat. No. 2,945,016 corresponding to Japanese Patent Publication No. 6544/1959 and U.S. Pat. No. 3,362,943 corresponding to Japanese Patent Publication No. 15830/1975).

It has generally been believed that in order to obtain a polymer having good uniformity in the practice of such a type of solution polymerization, the polymerization is preferably carried out at temperatures between the upper and lower cloud points, under which conditions the polymer solution is a homogeneous solution and does not tend to separate into two phases. In fact, this type of polymerization has been performed under such conditions. For example, U.S. Pat. No. 2,945,016 cited above proposes that in separating and recovering an olefin polymer, the temperature of the polymerization reaction mixture is adjusted to temperatures above its upper cloud point to separate it into two phases, and the polymer-rich liquid phase is separated and the polymer is recovered from it. But the polymerization in accordance with this technique is carried out under conditions which give a homogeneous polymer solution.

We found that when an attempt is made to produce high-molecular-weight polymers in accordance with such a conventional method, the viscosity of the polymer solution unduly increases and removing of the heat of polymerization, pumping of the product, stirring of the polymerization system, etc. cannot be effected smoothly. Because of these troubles, one has to operate at a low polymer concentration, and certain defects, such as reduced productivity per unit reactor volume, and the rise in the cost of separating the polymer, cannot be avoided.

We made extensive investigations in order to develop an improved process which can avoid the aforesaid disadvantages and defects of solution polymerization. These investigations have unexpectedly led to the discovery that the aforesaid disadvantages and defects can be conveniently overcome without impairing the uniformity of polymerization by performing the above-type of solution polymerization in a polymerization zone at a temperature above the upper cloud point and under conditions which enable the formation of two phases [condition (i)], and by employing stirring conditions which are sufficient to maintain the two phases in a good dispersed and mixed state [condition (ii)]. It is anticipated that under such condition (i), the uniformity of polymerization will be lost. Actually, however, the uniformity is maintained in this invention. We presume that this is because the above process gives a reaction system in a homogeneously dispersed and mixed state, such as finely divided liquid droplets of a higher polymer concentration in a liquid having a lower polymer concentration.

It was also found that by sending the resulting polymer solution to a separating zone located independently of said polymerization zone, thereby separating it into two phases in the separating zone at a temperature above the upper cloud point, and thereafter recovering the polymer-rich liquid phase as a lower layer while recycling the polymer-lean liquid phase as an upper layer to the polymerization zone [condition (iii)], the effect of cooling the reaction zone can be improved both in regard to heat energy and efficiency, and advantageously, the product can be recovered as a polymer solution of high concentrations.

Our investigations have shown that by performing the above type of solution polymerization under conditions (i), (ii), and (iii), many industrial advantages can be achieved. For example, the polymerization can be carried out while the apparent viscosity of the polymerization system is lower than in the case of performing the polymerization at a temperature below the upper cloud point but above the lower cloud point, under which conditions the polymer solution does not separate into two phases. Accordingly, the polymerization can be performed at a higher polymer concentration and the output per unit volume of reactor can be increased. Furthermore, since the viscosity is lower, the upper polymer-lean liquid phase having a better cooling efficiency can be recycled after cooling, and this leads to the advantage that removing of the heat of the reaction system can be improved both in regard to heat energy and efficiency. In addition, since the separated lower layer is a polymer-rich liquid phase, work-up for separation and recovery of the polymer becomes easier.

It is an object of this invention therefore to provide an improved process for the solution polymerization.

The above and other advantage objects of this invention will become apparent from the following description.

The process of this invention can be applied broadly to the polymerization of all monomers which can be formed, upon polymerization, into a solution having an upper cloud point of the corresponding polymer in a reaction medium being liquid under the reaction conditions. But since it is particularly suitable for the polymerization of olefins, the following detailed description will be directed to the polymerization of olefins.

In the practice of the polymerization process of this invention, various transition metal-containing catalysts, such as those proposed heretofore for use in medium to low pressure methods for polymerizing olefins. For example, such catalysts are prepared from a transition metal compound component and an organometallic compound of a metal of Groups I to III of the periodic table.

The transition metal compound component is a compound of a transition metal such as titanium, vanadium, chromium and zirconium, which may be liquid or solid under use conditions. It does not need to be a single compound, and may be supported on, or mixed with, another compound. Or it may be in the form of a complex with another compound. Preferably, the above catalyst component is a highly active transition metal compound component capable of forming at least 5,000 g, especially at least 8,000 g, of an olefin polymer per millimole of the transition metal. A typical example is a titanium catalyst component highly activated with a magnesium compound, such as a solid titanium catalyst component consisting essentially of titanium, magnesium and halogen, containing amorphous magnesium halide, and having a specific surface area of preferably at least about 10 m$^2$/g, more preferably about 40 m$^2$/g, especially preferably about 80 to about 800 m$^2$/g.

Such a highly active transition metal compound component may further contain an electron donor such as organic acid esters, silicic esters, acid halides, acid anhydrides, ketones, acid amides, tertiary amines, phosphoric esters, phosphorous esters and ethers.

An example of such a catalyst component is a highly active titanium compound component containing titanium, magnesium and halogen as essential ingredients which contains about 0.5 to about 12% by weight, preferably about 1 to about 8% by weight, of titanium, and has a titanium/magnesium atomic ratio of from about $\frac{1}{2}$ to about 1/100, preferably from about $\frac{1}{3}$ to about 1/50, a halogen/titanium atomic ratio of from about 4 to about 100, preferably from about 6 to about 80, and an electron donor/titanium mole ratio of from 0 to about 10, preferably from 0 to about 6.

A combination of a liquid titanium compound and a magnesium compound dissolved in a hydrocarbon solvent in the presence of an electron donor such as alcohols may also be cited as an example of such a titanium catalyst component.

These highly active titanium compound components are known, for example, in Japanese Patent Publication Nos. 34092/1971 (corresponding to U.S. Pat. No. 3,642,746), 1796/1978 (corresponding to U.S. Pat. No. 4,071,672), 26383/1972 (corresponding to U.S. Pat. No. 3,705,886) and 32270/1975 (corresponding to U.S. Pat. No. 4,071,674), Japanese Laid-Open Patent Publications Nos. 126590/1975 (corresponding to British Pat. No. 1,527,736), 20297/1976 (corresponding to British Pat. No. 1,492,618), 28189/1976 (corresponding to U.S. Pat. No. 4,076,924), 64586/1976, 92885/1976 (corresponding to U.S. Pat. No. 4,085,276) and 811/1981.

The organometallic compound to be used in combination with the above-described transition metal compound component may, for example, be an organometallic compound in which a metal of Groups I to III of the periodic table is bonded directly to carbon. Examples include organic alkali metal compounds, organic alkaline earth metal compounds and organoaluminum compounds. The organoaluminum compounds are preferred.

Specific examples of the organometallic compound include alkyllithiums, arylsodiums, alkylmagnesiums, arylmagnesiums, alkyl magnesium halides, aryl magnesium halides, alkyl magnesium hydrides, trialkyl aluminums, alkyl aluminum halides, alkyl aluminum hydrides, alkyl aluminum alkoxides, alkyl lithium aluminums, and mixtures of these.

In addition to the aforesaid two components, hydrogen, halogenated hydrocarbons, and electron donors such as organic acid esters, silicic esters, carboxylic acid halides, carboxylic acid amides, tertiary amines, acid anhydrides, ethers, ketones and aldehydes may be used to control stereospecificity, molecular weight, molecular weight distribution, etc. This electron donor component may be used in the polymerization as a complex or adduct with the organometallic compound, or as a complex or adduct with another compound, for example a Lewis acid such as aluminum trihalides.

Examles of olefins and polyenes that can be used in the process of this invention include $C_2$-$C_{18}$ olefins such as ethylene, propylene, 1-butene, 1-pentene, 1-hexene, 1-octene, 1-decene, 1-dodecene, 1-tetradecene, 1-hexadecene, 1-octadecene, 3-methyl-1-butene, 3-methyl-1-pentene, 4-methyl-1-pentene and 4,4-dimethyl-1-pentene; and polyenes (including dienes) such as butadiene, 1-isoprene, 1,4-hexadiene, dicyclopentadiene, 5-ethylidene-2-norbornene and 1,7-octadiene. They may be used either singly or as a mixture of two or more.

According to one preferred embodiment of this invention, ethylene or a mixture of ethylene and a $C_3$-$C_{18}$ α-olefin may be polymerized. Such a monomer may contain up to about 10 mole %, preferably up to about 5 mole %, of a polyene.

The process of this invention is especially suitable for the production of a homopolymer of ethylene or a non-elastomeric ethylene copolymer containing at least about 90 mole % of ethylene and the remainder being a $C_3$-$C_{18}$ α-olefin.

The olefin is polymerized under such conditions that the resulting olefin polymer dissolves in a reaction medium which is liquid under the reaction conditions. The reaction medium may, for example, be an inert hydrocarbon and/or the olefin itself used in the polymerization. Examples of the inert hydrocarbon are aliphatic hydrocarbons such as propane, butane, pentane, hexane, heptane, octane, nonane, decanone, dodecane and kerosene, alicyclic hydrocarbons such as cyclopentane, methylcyclopentane, cyclohexane and methylcyclohexane, aromatic hydrocarbons such as benzene, toluene and xylene, and mixtures of any two or more of these hydrocarbons.

According to the process of this invention, a monomer is polymerized under such conditions that the resulting polymer dissolves in the aforesaid reaction medium to form a solution of the polymer in the reaction medium which has an upper cloud point. This polymerization is carried out under conditions which satisfy the following conditions (i), (ii) and (iii).

(i) The polymerization is carried out in a polymerization zone at a temperature above the upper cloud point of said polymer solution and under conditions which enable the polymer solution to be separated into two phases;

(ii) the polymerization is carried out under stirring conditions which maintain the two phases under said phase-separating conditions in a dispersed and mixed state; and (iii) the resulting polymer solution is sent to a separating zone located independently of said polymerization zone, thereby separating it into two phases in the separating zone at a temperature above the upper cloud point, and thereafter, the polymer-rich liquid phase as a lower layer is recovered while the polymer-lean liquid phase as an upper layer is recycled to the polymerization zone.

As specified in (i), the polymerization in accordance with this invention is carried out at a temperature above the upper cloud point of the resulting polymer solution in the reaction medium, under which conditions the polymer solution can be separated into two phases. As is well known, the upper cloud point varies depending upon the types and proportions of the components of a liquid phase in the polymerization system, but can be easily preselected and determined experimentally as a temperature at which the intensity of transmitted light measured abruptly decays. As stated hereinabove, the polymer forms a homogeneous solution at temperature between the upper and lower cloud points, but when a temperature above the upper cloud point is reached, the polymer solution separates into a polymer-rich liquid phase and a polymer-lean liquid phase. Above the upper cloud point, there is a general tendency that as the temperature increases, the concentration of the polymer in the polymer-rich liquid phase increases and the concentration of the polymer in the polymer-lean liquid phase decreases.

The above two phase-separating range may vary depending upon not only the temperature condition, but also upon other conditions such as the type and proportion of the monomer or the polymer formed, the type of the solvent, and the pressure of the reaction system. Depending upon these operating conditions employed, the two phase-separating conditions involving temperature above the upper cloud point can be easily determined experimentally by the aforesaid technique of measuring transmitted light.

From the viewpoint of the polymerization operation, the viscosity of the polymerization system increases as the concentration of the polymer in the polymer-rich liquid phase increases, and a stirring power required for uniformly dispersing the polymer-rich phase in the polymer-lean phase increases with a consequent increased tendency for the polymer to adhere to stirring impellers or the reactor wall. The occurrence of these troubles, however, can be prevented, for example, by properly choosing the configuration of the stirring impellers. On the other hand, from the viewpoint of an operation of separating the two phases from each other, the separating efficiency is better as the difference in density between the two phases is large. The increased separating efficiency makes it possible to perform easily an operation required for work-up and to curtail the cost.

The polymerization temperature to be actually employed can be selected and determined by considering these operating advantages and disadvantages and various other factors such as variations in catalytic activity by temperature and the increase or decrease of the operating pressure which affects equipment cost. Generally, it is preferred to select temperatures between the upper cloud point and a temperature about 200° C. higher than it, particularly between a temperature about 10° C. higher than the upper cloud point and a temperature about 150° C. higher than the upper cloud point. When the above-described titanium catalyst component rendered highly active with a magnesium compound is used, it is preferred to perform the polymerization at a temperature in the range of about 100° to about 300° C., particularly about 120° to about 250° C.

The concentration of the olefin polymer varies depending upon its molecular weight. It is advantageous to adjust the polymer concentration to about 10 to about 1000 g/liter, preferably about 50 to about 200 g/liter, based on the total of the polymer-rich liquid phase and the polymer-lean liquid phase.

The suitable polymerization pressure is atmospheric pressure to about 150 kg/cm$^2$, especially about 2 to about 70 kg/cm$^2$. The amount of hydrogen which can be used as desired in the polymerization is about 0.0001 to about 20 moles, especially about 0.001 to about 10 moles, per mole of the olefin.

In the case of using the aforesaid transition metal compound, organometallic compound, electron donor, etc., as catalyst components, it is preferred to use the transition metal compound in an amount of about 0.0005 to about 1 millimoke, especially about 0.001 to about 0.5 millimole, as the transition metal atom, and the organometallic compound in an amount such that the metal/transition metal atomic ratio is from about 1 to about 2000, especially from about 1 to about 500, both per liter of the liquid phase of the polymerization zone. The electron donor is used preferably in an amount of 0 to about 1 mole, especially from 0 to about 0.5 mole, per mole of the organometallic compound.

According to the process of this invention, the polymerization is carried out also under stirring conditions so that the polymer-rich liquid phase and the polymer-lean liquid phase are well dispersed and mixed. If stirring is poor, phase separation occurs and the polymer-lean phase appear distinctly in the upper layer, resulting in impairment of the uniformity of polymerization. Accordingly, such stirring conditions which does not cause such phase separation are employed. By performing the polymerization in such a good dispersed and mixed state, the substantial viscosity of the polymerization system can be maintained at a lower level than in the case of performing solution polymerization in a homogeneous phase. Even in the production of high-molecular-weight polymers, polymerization can be carried out at a relatively high polymer concentration.

Advantageously, the polymerization of olefins is carried out continuously. For example, a method can be employed which comprises feeding required materials continuously into a polymerization reactor, while continuously withdrawing the resulting polymerization reaction mixture so that the volume of the reactor is kept constant. At this time, it is possible to use operating conditions which permit the presence of a vapor phase. Or there may be employed such operating conditions under which the reactor is filled fully with liquid.

In addition to performing the polymerization process of this invention under conditions (i) and (ii), it is essential to employ condition (iii) under which the resulting polymer solution is sent to a separating zone located independently of said polymerization zone, thereby separating it into two phases in the separating zone at a temperature above the upper cloud point, and thereafter, the polymer-rich liquid phase as a lower layer is recovered while the polymer-lean liquid phase as an upper layer is recycled to the polymerization zone.

Phase separation can be easily effected by omitting such a stirring operation as is done in the polymerization reactor. If required, the polymer solution may be heated. It is also possible to use a liquid-liquid separator such as a centrifugal separator or liquid cyclone. Needless to say, the separating zone should be maintained under the two phase-separating conditions involving temperatures above the upper cloud point. For this purpose, it is advantageous to employ the same conditions (temperature, pressure, etc.) as in the polymerization reactor.

Phase separation need not be performed completely, and, for example, it may be carried out such that a part of the polymer-lean liquid phase gets mixed with the polymer-rich liquid phase. The polymer-lean liquid phase as an upper layer may be partly or wholly recycled to the polymerization zone for re-use.

The heat of polymerization generated in the polymerization system can be effectively removed from the recycle phase by cooling it before it is again introduced into the polymerization zone. As compared with the cooling of the polymerization reaction mixture itself, the separated polymer-lean liquid phase has a high efficiency of heat exchange in a cooler because of its low viscosity. This is quite advantageous in commercial practice in regard to heat energy and efficiency. On the other hand, since a polymer solution of high concentration can be obtained by a simple means of separating the polymer-rich liquid phase in the separating zone, the operation required for separating the polymer can be made easy and the cost of separation can be reduced.

When only a single polymerization reactor is used in practicing the process of this invention, the polymer-lean phase may be recycled to that polymerization reactor. When a plurality of polymerization reactors are used, the polymer-lean liquid phase does not always need to be recycled to that reactor from which it originated, and may be fed into another reactor.

The polymer-rich liquid phase may be subjected to a suitable operation such as heating, flashing or vacuum suction to remove the inert hydrocarbon or the dissolved olefin, and then fed to an extruder for production of polymer pellets.

According to this invention, polymerization and the separation of the resulting polymer can be performed by simplified operation and apparatus with energy-saving and economic advantages.

The following Examples illustrate the invention in detail.

EXAMPLE 1

Preparation of a carrier-supported titanium catalyst component:

In a stream of nitrogen, 10 moles of commercially available anhydrous magnesium chloride was suspended in 50 liters of dehydrated and purified hexane. With stirring, 60 moles of ethanol was added dropwise over 1 hour, and the mixture was maintained at room temperature for 1 hour. Diethyl aluminum chloride (28 moles) was added dropwise to the reaction mixture, and the mixture was stirred for 1 hour. Subsequently, 75 moles of titanium tetrachloride was added. The mixture was heated to 80° C., and maintained at this temperature for 3 hours with stirring. The resulting solid (carrier-supported titanium catalyst component) was separated by decantation, and repeatedly washed with purified hexane to provide a suspension of the solid in hexane. The concentration of titanium was determined by titration.

Polymerization:

A continuous polymerization reactor A having a diameter of 50 cm and a capacity of 200 liters, as shown in FIG. 1, was used. A dehydrated and purified solvent (n-hexane containing 15% by volume of methylcyclopentane) was fed into the reactor A at a rate of 75 liters/hr through a line 3. Diethyl aluminum chloride (10 moles/hr) and the carrier-supported titanium catalyst component (0.5 moles as titanium) were fed into the reactor A continuously through a line 4. Simultaneously, ethylene, 1-butene and hydrogen were fed into the reactor A through lines 1 and 2 at a rate of 17.0 kg/hr, 3.4 kg/hr and 35 liters/hr, respectively. The monomers were polymerized at a temperature of 180° C. and a total pressure of 30 kg/cm$^2$·G while adjusting the residence time of the reaction mixture to 30 minutes.

The ethylene copolymer formed in the reactor A was continuously discharged through a line 5 at such a rate that the amount of the solvent discharged was 160 liters per hour. It was fed into a two-phase separator B while it was still maintained at a temperature of 180° C. and a pressure of 30 kg/cm$^2$·G.

The ethylene copolymer solution fed into the two-phase separator B separated into two phases. The polymer-rich liquid phase containing a major proportion of the ethylene copolymer was discharged from the bottom of the separator B through a line 7 at such a rate that the amount of the solvent discharged was 75 liters per hour. It was passed through a heater G and the solvent was separated by evaporation in a hopper C. Thus, the ethylene copolymer was obtained at a rate of 16.34 kg/hr. The ethylene copolymer had a melt index of 14.2 g/10 minutes and a density of 0.945 g/cm$^3$.

In the meantime, the polymer-lean liquid phase obtained in the two-phase separator B was withdrawn from the top of the separator B through a line 6 at such a rate that the amount of the solvent withdrawn was 85 liters/hr, passed through a cooler F by means of a pump D to cool it until the heat of polymerization could be removed. Thereafter, it was recycled to the reactor A.

The solutions containing the ethylene copolymer were sampled from the lines 5, 6 and 7 by means of sampling containers, and the concentrations of the ethylene copolymer in the sampled solutions were measured. They were found to be 108 g, 11 g and 218 g per liter of solvent respectively in the samples taken from the lines 5, 6 and 7.

These results show that in the separator B, the concentration of the copolymer increased to about 2.02 times. Hence, the amount of heat to be used in the heater G for evaporating the solvent from the polymer could be reduced to half. Since, on the other hand, the polymer-lean phase contained the polymer in a concentration of as low as 11 g/liter of solvent, the efficiency of heat exchange (the overall heat transmission coefficient U) in the cooler F increased, and the recycle solvent could be easily cooled.

Figure 2:
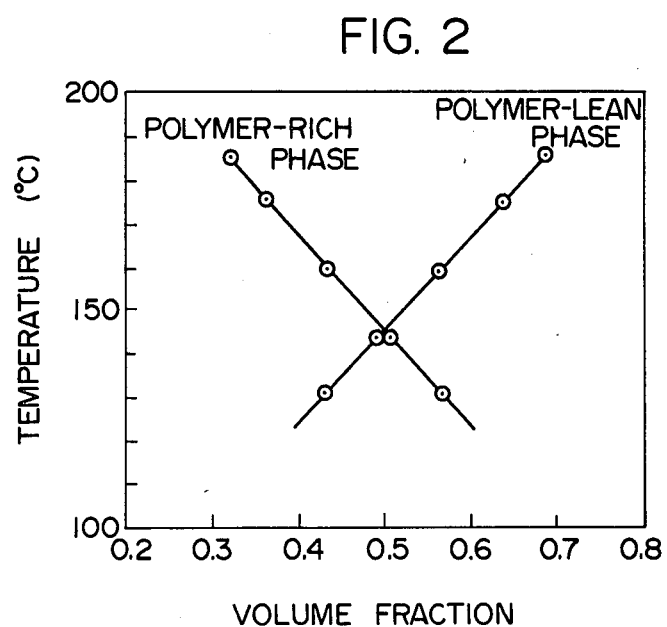
Figure 3:
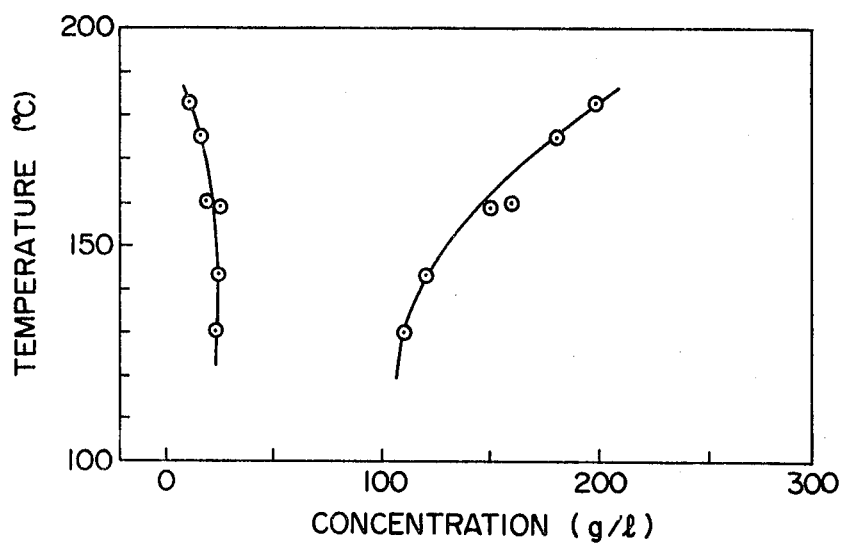
Figure 4:
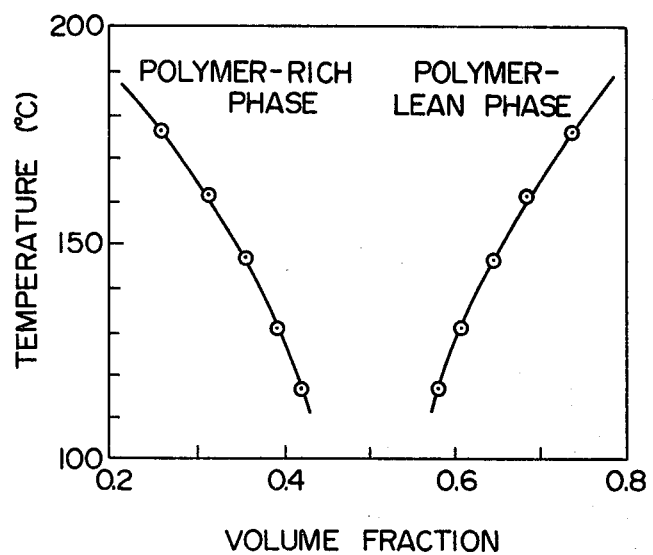
Figure 5:
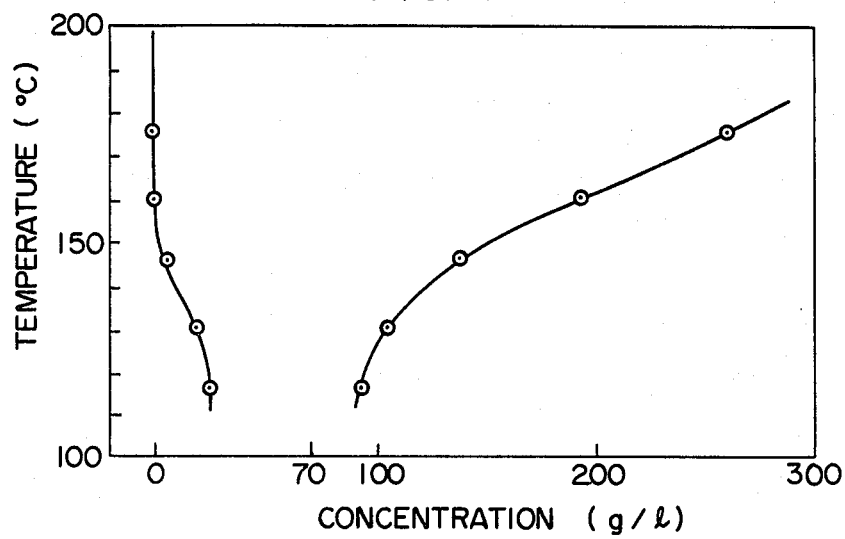
Figure 6:
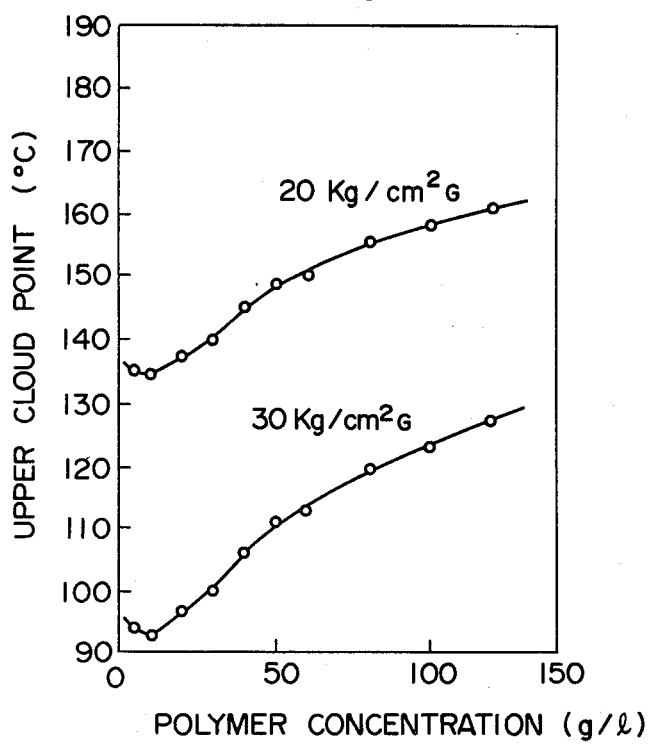

FIGS. 2 to 5 show the results of measurement of the concentrations of the ethylene copolymer in a polymer-lean phase and a polymer-rich phase which were obtained by a two-phase separation test at 30 kg/cm$^2$·G on a mixture consisting of an ethylene/1-butene copolymer having a melt index of 15 and a density of 0.945 g/cm$^3$, a mixture of 85 parts by volume of n-hexane and 15 parts by volume of methylcyclopentane, and ethylene. Specifically, FIG. 2 shows the relation between temperature and the volume fraction of the polymer-lean phase and the polymer-rich phase at a polymer concentration of 100 g/liter, and FIG. 3, the relation between temperature and the concentration of the polymer in each of the two phases at a polymer concentration of 100 g/liter. FIGS. 4 and 5 respectively show the relation between temperature and the volume fraction, and the relation between temperature and the concentration of the polymer in the two phases, respectively, at a polymer concentration of 70 g/liter. FIG. 6 shows the results of measurement of the upper cloud points of the aforesaid ethylene-1-butene copolymer/mixed hexane/ethylene system at the indicated pressures and polymer concentrations.

EXAMPLE 2

A 200 liter continuous polymerization reactor A, the same as in Example 1, was used. A dehydrated and purified solvent was fed into the reactor through line 3 at a rate of 60 liters/hr, and diethyl aluminum chloride (10 mmoles/hr) and the carrier-supported titanium catalyst component obtained in Example 1 (0.45 mmole/hr as titanium), through line 4. Simultaneously, ethylene, butene-1 and hydrogen were fed into the reactor through lines 1 and 2 at a rate of 12.5 kg/hr, 4.2 kg/hr and 26 liters/hr, respectively. The monomers were polymerized at a temperature of 180° C. and a total pressure of 30 kg/cm$^2$·G while adjusting the residence time of the reaction mixture to 30 minutes.

The ethylene copolymer formed in the reactor A was continuously discharged through line 5 at such a rate that the amount of the solvent discharged was 170 liters/hr. It was fed into the two-phase separator B while maintaining it at a temperature of 180° C. and a pressure of 30 kg/cm$^2$·G.

The ethylene copolymer solution fed to the two-phase separator B separated into two phases. The polymer-rich phase containing a major proportion of the resulting ethylene copolymer was discharged through line 7 at such a rate that the amount of the solvent discharged was 60 liters/hr. Thus, the ethylene copolymer was obtained at a rate of 12.0 kg/hr. The resulting ethylene had a melt index of 9.2 g/10 minutes and a density of 0.931 g/cm$^3$.

The concentrations of the ethylene copolymer in the polymer solutions sampled from lines 5, 6 and 7, respectively, were found to be 73 g/liter, 4 g/liter, and 200 g/liter.

The results show that in the two-phase separator B, the concentration of the polymer was increased to about 2.7 times. As in Example 1, the amount of heat used in heater G was decreased to about 1/2.5. Furthermore, the efficiency of heat exchange in the cooler F increased, and the recycle solvent could be easily cooled.

The ethylene/1-butene copolymer having a melt index of 9.2 and a density of 0.931 g/cm$^3$ had an upper cloud point of 121° C. at a pressure of 30 kg/cm$^2$·G and a polymer concentration of 70 g/liter.

What we claim is:

1. In a process for polymerizing a monomer capable of being formed, upon polymerization, into a solution having an upper cloud point of the corresponding polymer in a reaction medium being liquid under the reaction conditions, the polymerization being carried out under such conditions that the resulting polymer dissolves in the reaction medium; the improvement wherein
   (i) the polymerization is carried out in a polymerization zone under a pressure of from atmosphere pressure to about 150 kg/cm$^2$·G and at a temperature above the upper cloud point of said polymer solution and under conditions which enable the polymer solution to be separated into two phases,
   (ii) the polymerization is carried out under stirring conditions which maintain the two phases under said phase-separating conditions in a dispersed and mixed state, and
   (iii) the resulting polymer solution is sent to a separating zone located independently of said polymerization zone, thereby separating it into two phases in the separating zone at a temperature above the upper cloud point, and thereafter, the polymer-rich liquid phase as a lower layer is recovered while the polymer-lean liquid phase as an upper layer is recycled to the polymerization zone.

2. The process of claim 1 wherein said monomer is at least one member selected from the group consisting of ethylene, α-olefins and polyenes.

3. The process of claim 2 wherein the reaction medium is at least one member selected from the group consisting of inert hydrocarbons and the same olefins as used in the polymerization.

4. The process of claim 1 wherein the polymerization is carried out at a temperature between the upper cloud point and a temperature about 200° C. higher than the upper cloud point.

5. The process of claim 2 wherein the monomer is ethylene, or a mixture of ethylene and a C$_3$–C$_{18}$ α-olefin.

6. The process of claim 2 wherein the polymerization is carried out in the presence of a catalyst composed of (a) a highly active transition metal compound catalyst component capable of forming at least 5,000 g of polymer per millimole of titanium and containing titanium, magnesium and halogen as essential ingredients and (b) an organoaluminum compound.

7. The process of claim 1 wherein the polymerization is carried out at a pressure of from about 2 to about 70 kg/cm$^2$·G.

* * * * *